United States Patent Office

3,313,654
PROCESS FOR RECOVERING AMYLOSE FROM ACID-HYDROLYZED STARCH
David P. Macarus and Paul R. Shildneck, Decatur, Ill., assignors to A. E. Staley Manufacturing Company, Decatur, Ill., a corporation of Delaware
No Drawing. Filed Mar. 27, 1964, Ser. No. 355,420
10 Claims. (Cl. 127—69)

Our invention relates to a method for fractionating starch. More particularly, our invention relates to an improved method for recovering amylose from starch.

Ordinary starch is known to consist of two types of polymers of glucose, the linear polymer called amylose (sometimes referred to as the "A-fraction") and the branched chain polymer called amylopectin (sometimes referred to as the "B-fraction"). The relative content of amylose and amylopectin varies with the source of the starch. For example, it has been estimated that tapioca contains about 17–21% amylose; potato starch 22–25%; ordinary corn starch 22–30%; and so on. The amylose molecule is considered to be a long, linear chain of anhydroglucose units. The amylopectin molecule, on the other hand, is considered to be a larger, complex, branched chain of tree-like structure, with many of the branches themselves having branches, and so on.

Numerous methods have been developed for fractionating starch into its two carbohydrate components. U.S. Patent 2,515,096 to Schoch discloses a method for fractionating thin boiling starch by precipitating amylose as a complex from a fractionation medium consisting of water and a lower alcohol. U.S. Patent 2,829,990 to Bus discloses the use of a sulphate salt in the fractionation of starch. Additional procedures for fractionating starch are disclosed in U.S. Patents 3,067,067 (Wagoner et al.) and 2,779,692 (Cantor et al.). Recent work by Pulley indicates that carbon tetrachloride can be utilized to precipitate amylose in the form of a complex from a starch solution. This work is reported in a dissertation submitted to the graduate faculty of Iowa State University of Science and Technology, Ames, Iowa, entitled "Starch and Schardinger Dextrins" (1962). In the Pulley procedure a starch solution is formed and then carbon tetrachloride is added to the solution to precipitate the amylose. The solid material is then separated from the fractionation medium by centrifugation. While the procedure using carbon tetrachloride is satisfactory for producing small quantities of amylose, it possesses certain drawbacks which do not permit its economical use in large-scale commercial operations. One drawback is that a loose, pasty precipitate is formed which is difficult to separate from the fractionation medium without concurrent loss of the solid material. A further drawback is that in order to obtain a compact precipitate which is easily separated from the fractionation medium without concurrent loss of solid material, it is necessary to wash the precipitate repeatedly with water. An additional drawback is that even after repeated washings the amylose content of the solid material is relatively low.

We have now discovered an improved method for obtaining amylose from starch by the use of carbon tetrachloride. Our process is both economical and efficient and does not possess the above mentioned drawbacks of previously known procedures using carbon tetrachloride.

Generally stated, our process comprises effecting a solution of an acid-hydrolyzed thin-boiling starch (hereinafter termed thin-boiling starch) and then causing amylose to precipitate from the solution by the use of carbon tetrachloride. More particularly, our process comprises (a) providing an aqueous solution of the thin-boiling starch having a pH of from about 4.0 to about 9.0, a temperature of about 130 to about 200° F., the said solution containing not more than about 15% by weight of the thin-boiling starch on a dry substance basis, (b) adding not less than 10 parts by weight of carbon tetrachloride for each 100 parts by weight of starch dry substance to the solution to precipitate the amylose, the pH and the temperature of the said solution being maintained within the above defined limits throughout the precipitation procedure, and (c) then separating the precipitate containing the amylose from the fractionation medium.

In carrying out our invention, the aqueous solution of the thin-boiling starch may be prepared by any suitable procedure. The solution can be formed by heating a mixture of the thin-boiling starch in water under pressure at elevated temperatures, for example, in the range of 225 to 375° F. or the solution may be formed at room temperature by the addition of sodium hydroxide to a dispersion of the thin boiling starch in water. However, if the latter procedure is utilized it is normally necessary before the addition of carbon tetrachloride to the solution to adjust the pH into the range of 4.0 to 9.0 as with a mineral acid.

Even though solutions containing more than 15% by weight of the thin boiling starch dry substance are readily prepared we have found that their high viscosities make it difficult to obtain a compact, easily separable precipitate. For optimum results we have found it is preferable that the solution contain not more than 12% by weight of the thin-boiling starch dry substance. Our process is operative at concentrations even as low as 0.25 of 1%. However, for economical large scale operation it is not practical to utilize solutions containing less than about 4% by weight of the thin-boiling starch dry substance.

As previously stated, it is necessary that the pH of the solution be maintained within the range of 4.0 to 9.0 during the precipitation procedure. Proper precipitation of the amylose does not occur at a pH of above 9.0, while at a pH of below 4.0 substantial degradation of the amylose will occur. In order to minimize degradation and to effect optimum precipitation, it is preferable to maintain the pH of the solution within the range of 5.5 to 7.5.

Throughout the precipitation procedure it is also necessary that the temperature of the solution be kept within a certain range. Temperatures below 130° F. should be avoided in order to prevent gelling of the amylose unless the solution is stabilized as set forth in U.S. Patent 3,067,-067. Temperatures above 200° F. should also be avoided to prevent destruction of the carbon tetrachloride. High temperatures not only destroy the carbon tetrachloride, but result in the formation from the carbon tetrachloride of hydrochloric acid. The hydrochloric acid, in turn, can cause degradation of the amylose. Generally it is preferable to maintain a solution temperature of in the range of 140 to 185° F. throughout the amylose precipitation procedure. At temperatures above the atmospheric boiling point of carbon tetrachloride (about 150° F.) it is necessary to carry out the precipitation procedure under superatmospheric pressures in a closed vessel.

The aqueous starch solutions prepared at temperatures above 225° F. can be cooled rapidly or slowly to within the temperature range suitable for addition of carbon tetrachloride and amylose precipitation. We have found that for optimum separation of the amylose, it is preferable before addition of the carbon tetrachloride to rapidly cool the solution to the atmospheric boiling point as by flashing the solution to atmospheric pressure and then to slowly cool the solution to within the temperature range suitable for carbon tetrachloride addition. The entire cooling procedure preferably is carried out in a period of from one to three hours. The procedure of slow cooling is intended to include cooling the solution rapidly to within the temperature range suitable for carbon tetrachloride addition and then holding the solution within that temperature range for an extended period, for example one to three hours before addition of the carbon tetrachloride.

For successful practice of the invention it is necessary to utilize a certain minimum amount of carbon tetrachloride. If the ratio of carbon tetrachloride to thin-boiling starch is too low, insufficient precipitation of the amylose will occur. Generally speaking, satisfactory results are obtained by using not less than 10 parts by weight of carbon tetrachloride for each 100 parts by weight of thin-boiling starch dry substance. Preferably it is desirable to utilize in the range of 15 to 50 parts of carbon tetrachloride for each 100 parts by weight of starch dry substance. Even though no harmful effects are obtained, it is not practical to utilize a higher ratio of carbon tetrachloride to starch.

The carbon tetrachloride can be incorporated with the aqueous thin-boiling starch solution in any suitable manner. The carbon tetrachloride can be added to the solution or the solution can be added to the carbon tetrachloride. We have found that, for ease of operation, it is preferable to add the carbon tetrachloride to the aqueous starch solution. This addition is typically carried out by adding the carbon tetrachloride to the solution batch-wise, or by adding it incrementally over a selected period of time.

The time required for complete precipitation of the amylose will vary depending, among other things, on the concentration of the thin-boiling starch in the solution, the ratio of carbon tetrachloride to the starch, the pH of the solution and the temperature of the solution. When operating within the preferred limits of our procedure, complete precipitation typically occurs in a period of from about 1 to about 3 hours. However, this period may be longer or shorter. Precipitation of the amylose is usually accelerated by agitating the fractionation medium during precipitation of the amylose.

After precipitation, the amylose can be separated from the fractionation medium by any suitable procedure. For example, separation can be carried out by centrifugation or by filtration. We prefer to separate the amylose from the fractionation medium by centrifugation, as with a high-speed centrifuge. During the separation it is desirable also to avoid temperatures which would cause gellation or degradation of the amylose. After separation from the fractionation medium the precipitated amylose can be dried, as by roll drying or by spray drying, or dissolved in a suitable solvent such as water, to form an amylose solution. If desired, the amylose may be first washed with water to remove residual amylopectin before it is dried or dissolved. During the separation and the drying procedures the carbon tetrachloride-amylose complex is destroyed. Substantially all of the carbon tetrachloride is then removed by vaporization. Therefore, the recovered amylose is substantially free of carbon tetrachloride.

The amylopectin remaining in solution in the fractionation medium may be recovered by any suitable procedure, as by spray drying, roll drying or other methods for removing water rapidly or it may be used without drying, for example, in the manufacture of syrup.

The acid-hydrolyzed thin-boiling starch found useful in our process is readily prepared by the hydrolysis of starch with an acid in the wet slurry state following conventional procedures. If this hydrolysis is carried too far (i.e. if the starch becomes too thin), a considerable amount of the amylose in the starch is destroyed and it becomes uneconomical to carry out our fractionation procedure. Because of this we prefer to utilize those starches which have been hydrolyzed to give them a fluidity of not more than about 90. As a compromise between minimizing the destruction of the amylose and obtaining optimum results from our procedure we prefer to utilize starches having a fluidity ranging from about 20 to about 60. The fluidity of the starch is determined by the 5-gram alkaline fluidity procedure which is conducted as follows:

5 grams of starch are dispersed in 10 ml. of distilled water, the water having a temperature of 77° F. To this dispersion are then added 90 ml. of a 0.25 N sodium hydrolyzed solution, the solution having a temperature of 77° F. The resulting mixture is then immediately stirred for 3 minutes at 475 r.p.m. After stirring, the resulting starch solution is placed in a water bath and maintained in the bath at a temperature of 77° F. for 30 minutes. At the end of the 30-minute period the starch solution is poured into a standard fluidity funnel having a specific "water-time" of 36 seconds. The water-time is the number of seconds it takes for 100 cc. of water to flow through the funnel. The number of cc. of starch solution to flow through the funnel in the water-time is the alkaline fluidity of the starch solution.

The starch used to produce our thin-boiling starch can be obtained from the root, the stem or the fruit of a starch-producing plant, and includes potato, cassava, sorghum, sago, corn, etc. Mainly because of its ready availability and great abundance, we prefer to use starch derived from ordinary dent corn, and we can use those varieties having more than 30% amylose in the starch. The cereal starches, among them corn starch, contain small amounts of fatty acid. In certain applications, for example, in the formation of amylose films, it is desirable that the amylose be substantially free of the fatty acids. In our process this can be accomplished by using cereal starches which have been subjected to a defatting treatrated from the thin-boiling starch.

The following examples are offered to illustrate but not to limit our invention.

EXAMPLE I

An aqueous solution was prepared by passing a mixture of 2640 grams of water and 360 grams of unmodified corn starch dry substance through a coiled heat exchanger in a constant temperature oil bath to a pressurized collection vessel. A solution temperature of 310° F. was reached in the heat exchanger. The solution was then transferred to an insulated vessel equipped with a heating means. Upon removal to atmospheric pressure, the temperature of the solution rapidly dropped to a few degrees below 212° F. The solution was allowed to cool for 30 minutes to 175° F. The cooled solution was then maintained at about 175° F. for a period of about 90 minutes, after which 2000 grams of water were added to the solution, the added water having a temperature of about 175° F. The solution was then transferred to a closed vessel and 54 grams of carbon tetrachloride were added to it. The solution was then gently stirred for a period of about one hour to form a precipitate. During the one-hour period the temperature of the solution was maintained at about 175° F. The precipitate was then separated from the fractionation medium by centrifugation at 140° F. using a Fletcher standard centrifuge rotating at 1560 r.p.m. The centrifuge cake was a loose, pasty material and was difficult to separate from the fractionation medium without loss of solid material. The separated cake weighed 1565 grams. The centrifuge cake was then washed with water using 4 grams of water for each gram of cake and then recentrifuged. It was necessary to repeat this procedure two additional times before a compact, easily separable, centrifuge cake was obtained. The centrifuge cake was then roll dried to give 49.0 grams of solid material having an amylose content 65.3%. The carbon tetrachloride was removed during the centrifugation and drying procedures, therefore the recovered material is substantially free of carbon tetrachloride.

EXAMPLE II

The procedure of Example I was followed in all essential details using an unmodified starch with the exception that the material was roll dried after repeating the centrifugation step only once instead of three times as in Example I. The centrifuge cake resulting from the first centrifugation step was a loose, pasty material. The roll dried material weighed 66.5 grams and had an amylose content of 64.9%.

EXAMPLE III

This example is offered to show the effectiveness of our procedure in the recovery of amylose using an acid-hydrolyzed thin-boiling starch.

An aqueous solution was prepared by passing a mixture of 3520 grams of water and 480 grams dry substance of an acid-hydrolyzed, thin-boiling starch, having an alkaline fluidity (5 gram test) of in the range of about 20 to 27, through a coiled heat exchanger in a constant temperature oil bath to a pressurized collection vessel. A solution temperature of 310° F. was reached in the heat exchanger. The solution was then transferred to an insulated vessel equipped with a heating means. Upon removal of atmospheric pressure the temperature of the solution rapidly dropped to a few degrees below 212° F. The solution was allowed to cool for 30 minutes to 175° F. The cooled solution was then maintained at 175° F. for a period of about 90 minutes, after which 2000 grams of water were added to the solution, the added water having a temperature of about 175° F. The solution was then transferred to a closed vessel and 72 grams of carbon tetrachloride were added to the solution. The solution was then gently stirred for a period of one hour to form a precipitate. During the one-hour period the temperature of the solution was maintained at about 175° F. The precipitate was then separated from the fractionation medium by centrifuging at 140° F. using a Fletcher standard centrifuge rotating at 1560 r.p.m. The centrifuge cake was a compact, curd-like material weighing 900 grams. It was easily separated from the fractionation medium without undue loss of the solid material. This cake was then washed by slurrying with water utilizing 4 grams of water for every gram of centrifuge cake and then subjected to centrifugation. The thus obtained centrifuge cake was then roll dried to give 96.0 grams of solid material having an amylose content of 79.2%.

A comparison of the results of Example III, wherein an acid-hydrolyzed thin-boiling starch was utilized, with the results of Example I and II, wherein unmodified raw corn starches were utilized, shows the superiority of our process in the recovery of amylose. The wet centrifuge cake obtained after the first centrifugation step in Example III was a compact cake of the type easily separable from the fractionation medium without undue loss of solid material. On the other hand, the cakes obtained after the first centrifugation step in Examples I and II were loose and pasty, thus making them difficult to separate from the fractionation medium without concurrent loss of solid material. The material obtained in Example I required additional washings before a compact cake was obtained. The amylose content of the material recovered in Example III was more than 20% greater than the amylose content of the materials recovered in Examples I and II.

EXAMPLE IV

The procedure of Example III was followed in all essential details except that 2640 grams of water and 360 grams of acid-hydrolyzed thin-boiling starch having an alkaline fluidity (5 gram test) of in the range of 20 to 27, were utilized. The roll dried material weighed 68.0 grams and had an amylose content of 79.2%.

EXAMPLE V

The procedure of Example III was followed in all essential details with the exception that an acid-hydrolyzed, thin-boiling starch having an alkaline fluidity in the range of 32 to 40 (5 grams test) was utilized as the starch material. The wet centrifuge cake obtained after the first centrifugation step was a compact cake which was easily separated from the fraction medium without loss of solid material. The roll dried material had an amylose content of 80.9%.

Since many embodiments of this invention may be made and since many changes may be made in the embodiments described, the foregoing is to be interpreted as illustrative only and our invention is defined by the claims appended hereafter.

We claim:

1. The process of recovering amylose from acid-hydrolyzed starch which comprises providing an aqueous solution of acid-hydrolyzed thin-boiling starch, the said solution having a temperature ranging from about 130 to about 200° F., a pH from about 4.0 to about 9.0 and a starch dry substance content of from about 0.25% to about 15% by weight based on the weight of the solution, combining carbon tetrachloride with the solution, the amount of carbon tetrachloride being not less than 10 parts by weight for each 100 parts by weight of starch dry substance, maintaining the temperature of the solution at from about 130 to about 200° F. and the pH of the solution at from about 4.0 to about 9.0 to effect precipitation of the amylose, and separating the precipitated amylose from the solution.

2. The process of claim 1, wherein the acid-hydrolyzed starch has an alkaline fluidity of not more than about 90.

3. The process of recovering amylose from acid-hydrolyzed starch, the said starch having an alkaline fluidity of not more than 90, the said solution having a temperature ranging from about 140 to about 185° F., a pH of from about 5.5 to about 7.5 and a starch dry substance dry content of from 0.25% to about 12% by weight by weight based on the weight of the solution, combining carbon tetrachloride with the solution, the amount of carbon tetrachloride being not less than 15 parts by weight for each 100 parts by weight of starch dry substance, maintaining the temperature of the solution at from about 140 to about 185° F. and the pH of the solution at from about 5.5 to about 7.5 to effect precipitation of the amylose, separating the precipitated amylose from the solution and recovering the amylose.

4. The process of claim 3, wherein the acid-hydrolyzed starch has an alkaline fluidity of from about 20 to about 60.

5. The process of claim 4, wherein the carbon tetrachloride is added to the solution.

6. The process of recovering amylose from acid-hydrolyzed starch which comprises forming a fluid solution consisting essentially of acid-hydrolyzed thin-boiling starch in water by heating it to from about 225° F. to about 375° F., rapidly cooling the said solution to about the atmospheric boiling point of water, then slowly cooling the said solution to in the range of about 130° to about 200° F., the concentration of the starch dry substance in the cooled solution being from about 0.25% to about 15% by weight based on the weight of the solution, the pH of the cooled solution ranging from about 4.0 to about 9.0, combining carbon tetrachloride with the cooled solution, the amount of carbon tetrachloride being not less than 10 parts by weight for each 100 parts by weight of starch dry substance, maintaining the temperature of the solution at from about 130° F. to about 200° F. and the pH of the solution at from about 4.0 to about 9.0 to effect precipitation of the amylose, and separating the precipitated amylose from the solution.

7. The process of recovering amylose from acid-hydrolyzed starch which comprises forming a fluid solution consisting essentially of acid-hydrolyzed thin-boiling starch in water by heating it from about 225° F. to about 375° F., the said starch having an alkaline fluidity of not more than about 90, rapidly cooling the said solution to about the atmospheric boiling point of water, then slowly cooling the said solution to in the range of 140 to about 185° F., the concentration of the starch dry substance in the cooled solution being from about 0.25% to about 12% by weight based on the weight of the solution, the pH of the cooled solution ranging from about 5.5 to about 7.5, combining carbon tetrachloride with the cooled solution, the amount of carbon tetrachloride being not less than about 15 parts by weight for each 100 parts of weight of starch dry substance, maintaining the temperature of the solution at from about 140 to about 185° F. and the pH of the solution at from about 5.5 to about 7.5 to effect precipitation of the amylose, separating the precipitated amylose from the solution and recovering the amylose.

8. The process of claim 7, wherein the acid-hydrolyzed starch has an alkaline fluidity of from about 20 to about 60.

9. The process of claim 8, wherein the amount of carbon tetrachloride is from about 15 to about 50 parts by weight for each 100 parts by weight of starch dry substance.

10. The process of claim 8, wherein the carbon tetrachloride is added to the solution.

References Cited by the Examiner

Pulley A. O., Ph.D., thesis, Starch and Schardinger Dextrins I, Complete with Hydrophobic Compounds, II Higher Schardinger Dextrin Homologs, Iowa State University of Science and Technology, 1962, page 9 of part I relied upon.

MORRIS O. WOLK, *Primary Examiner.*

E. G. WHITBY, *Assistant Examiner.*

UNITED STATES PATENT OFFICE
CERTIFICATE OF CORRECTION

Patent No. 3,313,654                                April 11, 1967

David P. Macarus et al.

It is hereby certified that error appears in the above numbered patent requiring correction and that the said Letters Patent should read as corrected below.

Column 4, lines 30 and 31, for "treatrated from the thin-boiling starch." read -- treatment or by defatting the amylose after it has been separated from the thin-boiling starch. --; line 67, for "content 65.3%" read -- content of 65.3% --; column 5, line 75, for "fraction" read -- fractionation --.

Signed and sealed this 29th day of October 1968.

(SEAL)
Attest:

Edward M. Fletcher, Jr.                                EDWARD J. BRENNER

Attesting Officer                                             Commissioner of Patents